(12) United States Patent
Larson

(10) Patent No.: US 6,334,680 B1
(45) Date of Patent: Jan. 1, 2002

(54) POLARIZED LENS WITH OXIDE ADDITIVE

(75) Inventor: Charles P. Larson, Bellevue, WA (US)

(73) Assignee: Optimieyes Limited Partnership, CA (US)

( * ) Notice: Subject to any disclaimer, the term of this patent is extended or adjusted under 35 U.S.C. 154(b) by 0 days.

(21) Appl. No.: 09/255,093

(22) Filed: Feb. 22, 1999

Related U.S. Application Data (60) Provisional application No. 60/075,577, filed on Feb. 23, 1998.

(51) Int. Cl.[7] .............................. G02C 7/02; G02C 7/10
(52) U.S. Cl. ........................ 351/159; 351/41; 351/163
(58) Field of Search ...................... 351/159, 41, 44–46, 351/49, 160 R, 160 H, 163–166; 623/6, 6.17, 6.56, 6.62

(56) References Cited

U.S. PATENT DOCUMENTS

| | | | |
|---|---|---|---|
| 3,617,114 A | 11/1971 | Rogers | 351/49 |
| 3,649,696 A | 3/1972 | Kazan, Jr. | 568/333 |
| 4,160,584 A | 7/1979 | Giles | 351/49 |
| 4,240,836 A | * 12/1980 | Borelli et al. | 501/13 |
| 4,311,368 A | 1/1982 | Saito et al. | 351/165 |
| 4,315,186 A | 2/1982 | Hirano et al. | 313/111 |
| 4,320,940 A | 3/1982 | Mueller et al. | 351/44 |
| 4,521,524 A | 6/1985 | Yamashita | 501/64 |
| 4,838,673 A | 6/1989 | Richards et al. | 351/44 |
| RE33,729 E | 10/1991 | Perilloux | 359/359 |
| 5,061,659 A | 10/1991 | Ciolek et al. | 501/64 |
| 5,077,240 A | 12/1991 | Hayden et al. | 501/67 |
| 5,135,298 A | 8/1992 | Feltman | 351/163 |
| 5,149,181 A | * 9/1992 | Bedford | 351/166 |
| 5,149,183 A | 9/1992 | Perrott et al. | 359/885 |
| 5,177,509 A | 1/1993 | Johansen et al. | 351/44 |
| 5,190,896 A | 3/1993 | Pucilowski et al. | 501/64 |
| 5,245,470 A | 9/1993 | Keum | 359/485 |
| 5,327,180 A | 7/1994 | Hester, III et al. | 351/165 |
| 5,548,491 A | 8/1996 | Karpen | 362/510 |
| 5,792,822 A | * 8/1998 | Miyabayashi et al. | 526/240 |
| 5,922,246 A | * 7/1999 | Matsushita et al. | 252/582 |
| 5,949,518 A | * 9/1999 | Belmares et al. | 351/166 |
| 5,973,865 A | * 10/1999 | Havens et al. | 351/166 |
| 6,145,984 A | 11/2000 | Farwig | 351/49 |

OTHER PUBLICATIONS

Vibrant Optics—Unique Color–Enhancing Polarized Sunglasses, Copyright 1996 (4 pages).

Schott Products & Applications, Opthalmic Glass Contrast Enhancement Glass, Major Blanks, S–4315 UV–SG gray, S–5321 UV–SG Brown, and S–8807 Ace, Amethyst Contrast Enhancers. (2 pages) Copyright 1999–2000.

(List continued on next page.)

Primary Examiner—Jordan M. Schwartz (57) ABSTRACT

A lens for reducing glare and improving color discrimination includes a lens wafer containing a rare earth oxide such as neodymium that provides relatively high light transmittancy at 450 nm, 540 nm, and 610 nm, and relatively low light transmittency at 500 nm and at 580 nm. A polarized filter is included to reduce glare, and an anti-reflective layer minimizes ghost images, haze, and loss of contrast.

4 Claims, 11 Drawing Sheets

OTHER PUBLICATIONS

Schott Products & Applications, Rare Earth Doped Filter Glass (5 pages) © 1999–2000.

Schott Products & Applications, Contrast Enhancement Filter—S8801 for Display Applications (3 pages) © 1999–2000.

Schott Products & Applications, Contrast Enhancement Filter—S8802 for Display Applications (3 pages) © 1999–2000.

Schott Products & Applications, Contrast Enhancement Filter—S8806A for Display Applications (3 pages) © 1999–2000.

Schott Products & Applications, Contrast Enhancement Filter—S8807 for Display Applications (3 pages) © 1999–2000.

Schott Products & Applications, Contrast Enhancement Filter—S8808 for Display Applications (3 pages) © 1999–2000.

Schott Products & Applications, Contrast Enhancement Filter—S8809 for Display Applications (3 pages) © 1999–2000.

Coblentz et al., "Spectral–Transmissive Properties and Use of Colored Eye–Protective Glasses" (1938), pp. 1–26.

Thornton "Three–Color Visual Response" Journal of the Optical Society of America vol. 62, No. 3 (Mar. 1972), pp. 457–459.

Thornton "Luminosity and Color–Rendering Capability of White Light" Jornal of the Optical Society of America vol. 61, No. 9 (Sep. 1971), pp. 1155–1163.

* cited by examiner

POLARIZED LENS WITH OXIDE ADDITIVE

This application claims domestic priority from my earlier filed provisional application, Ser. No. 60/075,577, filed Feb. 23, 1998.

FIELD OF THE INVENTION

This invention relates to lenses and more particularly to lenses incorporating polarizing films or coatings and processes of making such lenses utilizing oxide additives that have distinct transmission and absorption qualities.

BACKGROUND OF THE INVENTION

One challenge faced by lens manufacturers concerns glare. The term glare refers to the presence of one or more areas in the field of vision that are of sufficient brightness to cause an unpleasant sensation, a temporary blurring of vision, or a feeling of ocular fatigue. Glare occurs when patches of bright light are reflected from smooth, shiny surfaces into the eye. Typical reflecting surfaces include water, snow, roadways and glass. Reflections are not only annoying but interfere with vision, at times seriously.

It takes more than regular sunglasses to protect a person from the discomfort and vision-depleting effects caused from glare. Tinted lenses or other filters are of little help in controlling disability or discomfort glare. If a hot spot in the visual field is ten times as bright as the background illumination, the use of a filter with 50% transmittance is of little help in the visual field, because both the hot spot and the background are reduced by the same percentage. However, light-polarizing lenses are useful in controlling glare because they filter only polarized light, and directly-reflected sunlight is polarized, while ambient lighting is not.

Another challenge faced by lens manufacturers concerns light reflecting off the lens itself. When light reaches the boundary between two transparent media having different indices of refraction, most light is refracted, but a small amount is reflected. Reflected light may be troublesome because it can produce ghost images, falsification of image position, haze and loss of contrast of images being viewed through a lens. Reflected light can reduce transmission up to 12% on certain lens materials.

Applying an anti-reflection (AR) coating on the front and back surface of a lens can increase the transmittance of light to over 99%. Unfortunately, anti-reflective coatings are relatively soft and tend to scratch easily. In addition, they tend to display greasy marks and smudges and require frequent and careful cleanings. The more effective the AR coating (greater transmission), the greater the chance that lens surface imperfections will be seen.

To increase the hardness of a coating and to make marks less noticeable and the surface easier to clean, hydrophobic coatings are applied. A hydrophobic coating is a special layer (usually silicon) placed on top of an anti-reflective coating. The hydrophobic coating is a smooth, flexible layer, which fills in the pores in the surface of the anti-reflective layers. This final hydrophobic layer creates a hard slick surface giving the lens greater scratch resistance, water-repellant features, and easier cleaning capabilities.

A third and even more complex challenge faced by designers of sunglasses is to maintain the wearer's ability to distinguish objects based on color.

Figure 1:
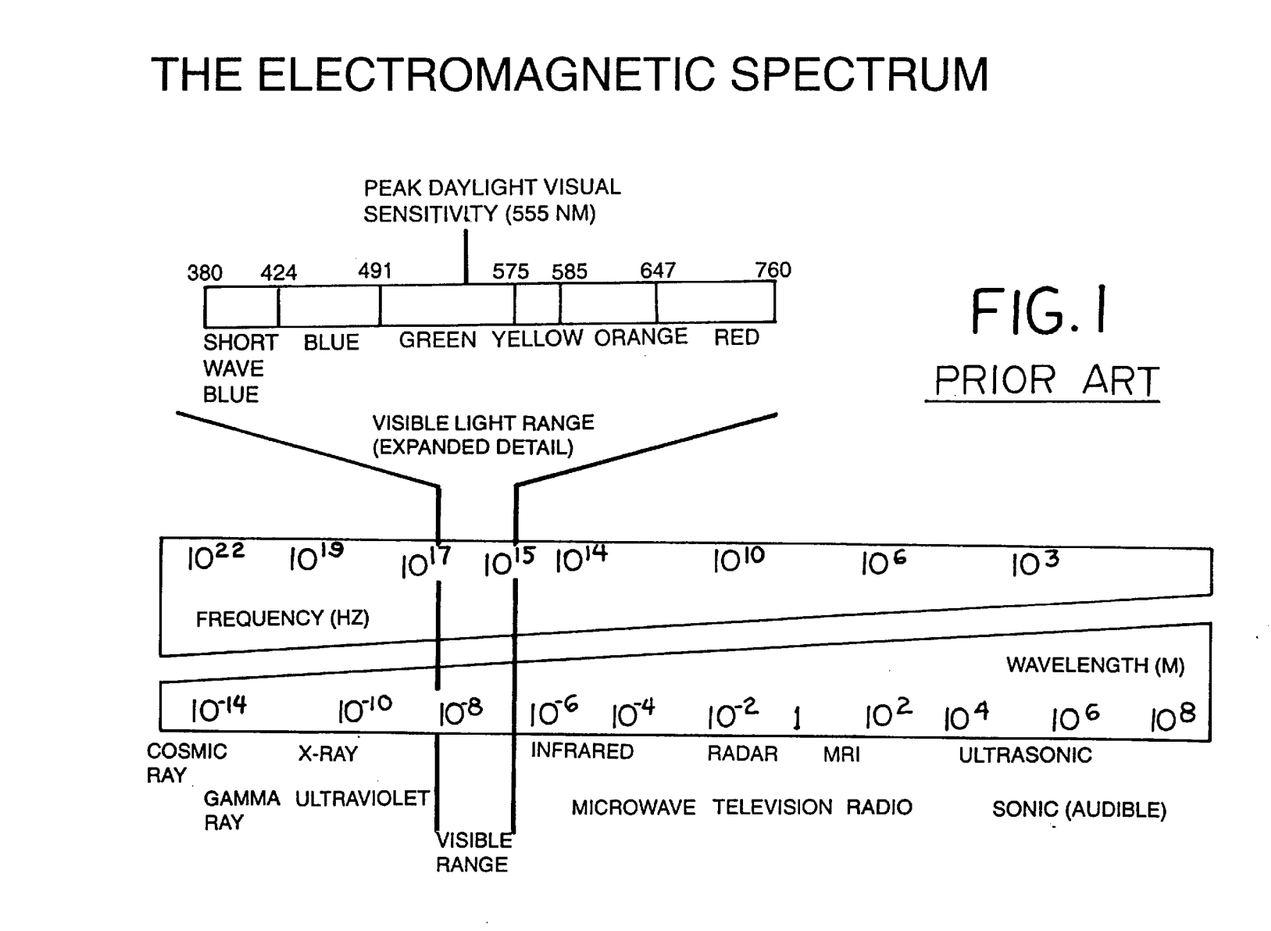
FIG. 1 is a diagram of the electromagnetic spectrum.
Figure 2:
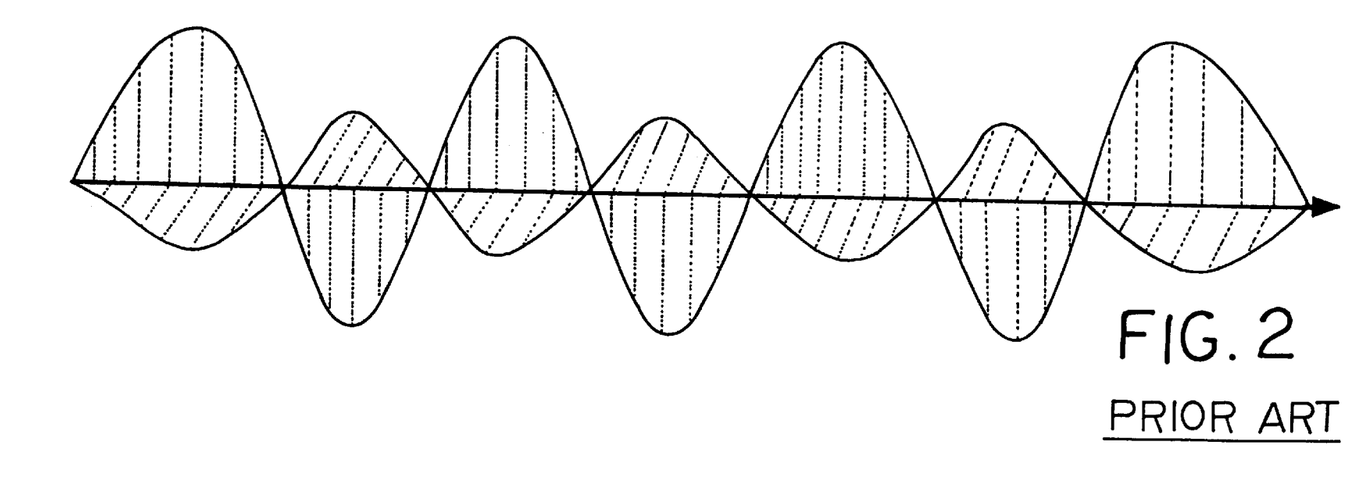
FIG. 2 is a diagram showing light wave motion on a plurality of planes.

Radiation is a physical term defining the transfer of energy through space, from an emitter or radiator to a receiver. When light is emitted by a source and is subsequently absorbed by a receptor, a net transfer of energy occurs. The sun is a radiator, producing energy that radiates through space in all directions. The sun's radiation is called electromagnetic radiation because it consists of an oscillatory electric field and of an oscillatory magnetic field which are perpendicular to one another and to the direction of propagation of the radiation. This radiation consists of minute particles called photons. The distance of measurement between one oscillation of one photon is called a nanometer (nm). A single photon can differ from another photon in only one respect: its energy. A high value of this nm measurement denotes considerable sluggishness and so implies a low frequency of oscillation and a low energy. A photon of shorter wavelength oscillates more frequently and carries more energy. And to these differences in energy our eyes respond, enabling us to see colors High-energy light, in which most of the photons have wavelengths of around 400 nm looks blue or violet, while low-energy light, containing photons mainly of wavelengths around 700 nm, looks red. The light that is sensitive to humans lies within the visible spectrum. The visible spectrum consists of several colors that have different levels of energy. This is illustrated in FIG. 1 of the drawings, which shows the electromagnetic spectrum.

The following Table 1 shows the correspondence between energy levels and human color sensation:

TABLE 1

| Color Sensation | Wavelength (nm) |
| --- | --- |
| Violet | 380 to 424 |
| Blue | 424 to 491 |
| Green | 491 to 575 |
| Yellow | 575 to 585 |
| Orange | 585 to 647 |
| Red | 647 to 760 |

Studies conducted in connection with the manufacture of artificial lighting have found that human color vision may be characterized chromatically by three channels. Chromatic response falls nearly to zero in the blue-green near 500 nm and in the yellow near 580 nm, as well as in violet beyond 400 nm and in the deep red beyond 700 nm. The minima may be related to the fact that the red-green-blind protanope sees no hue at all near 500 nm and the tritanope sees no hue near 580 nm. These wavelengths impair proper identification of chromaticities of colored objects. The eye uses wavelengths near 450, 540, and 610 nm most effectively, and in a sense samples, at these wavelengths, all incoming light. Color discrimination can be improved by elimination of wavelengths near 500 and 580 nm,[1] increasing color discrimination per watt input at the eye.[2]

[1]Journal of the Optical Society of America, Volume 62, Number 3, Pages 457 through 459.
[2]Journal of the Optical Society of America, Volume 61, Number 9, Pages 1155 through 1163.

SUMMARY OF THE INVENTION

According to the invention, a lens has a layer that includes an oxide additive resulting in a relatively high light transmittancy at 450 nm, 540 nm, and 610 nm, and a relatively low light transmittancy at 500 nm and at 580 nm. Including a layer having such properties in a lens along with a polarizing filter can result in a particularly useful lens.

DETAILED DESCRIPTION OF PREFERRED EMBODIMENTS

According to the invention, a lens or pair of lenses is provided which may be incorporated into items such as eyeglasses, cameras, binoculars, scopes, or any other instrument designed for viewing that utilizes a lens. A lens according to the invention may improve a person's vision by reducing obtrusive glare and increasing color discrimination.

Figure 4:
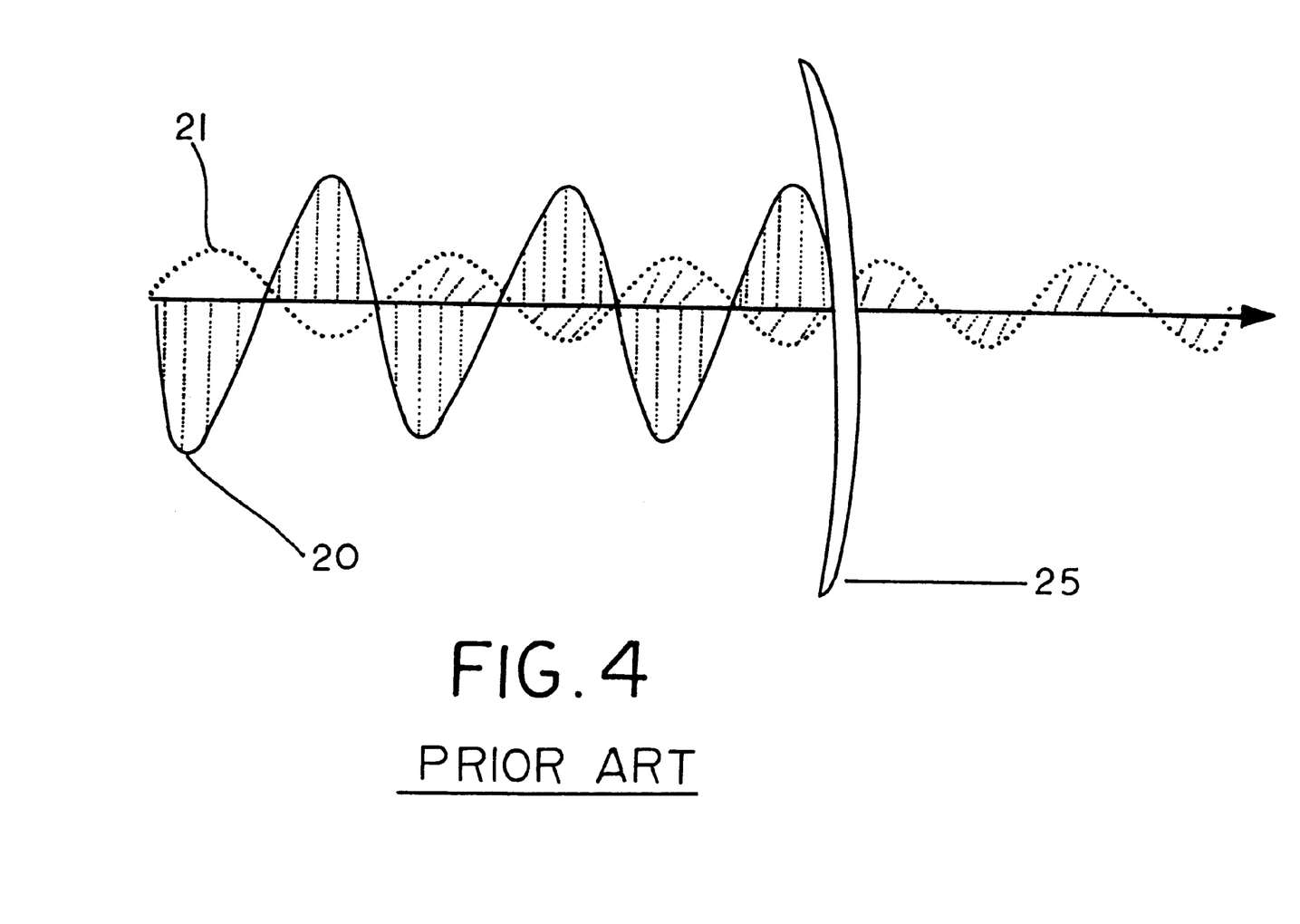
FIG. 4 is a schematic illustration of a wave motion of light showing two light waves, one at a right angle to the other, one wave being polarized and absorbed by a polarized lens.
Figure 10:
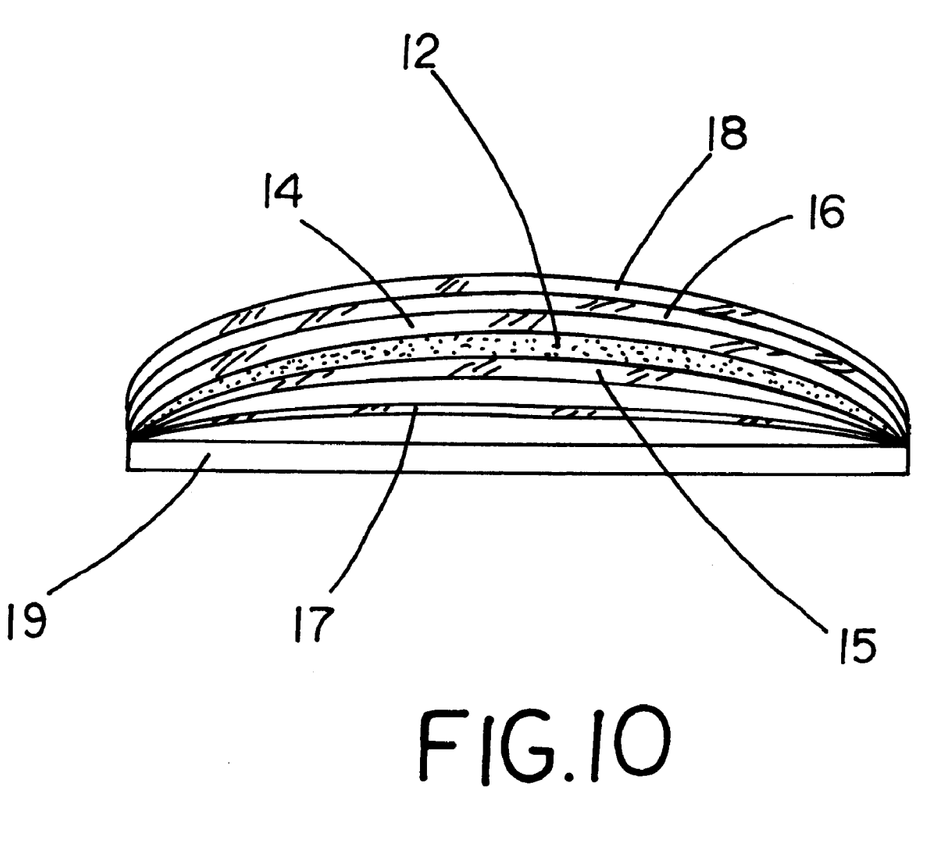
FIG. 10 is a schematic view of a second embodiment of a lens according to the invention.

As seen in FIG. 10, one example of a lens 10 in accordance with the invention includes a polarized filter 12 to eliminate glare. Glare is primarily caused by reflected light emanating from the sun. Because such light is polarized, use of a polarizing filter within or on the lens can reduce the visually obstructing effects of glare Human vision does not distinguish between polarized and non-polarized light. However, polarized films can absorb certain orientations of polarized light. FIG. 4 which shows two light waves 20, 21 at right angles to each other, one of them (20) being a polarized light wave. A lens 25 has a polarized film that absorbs light oscillations in one direction, but not the component oriented at right angles. The aligned particles of the film transmit one plane of polarized light and absorb the perpendicular polarized light. As a result, the polarized film effectively reduces, and in many cases eliminates, the vision disturbance created by glare.

Figure 3:
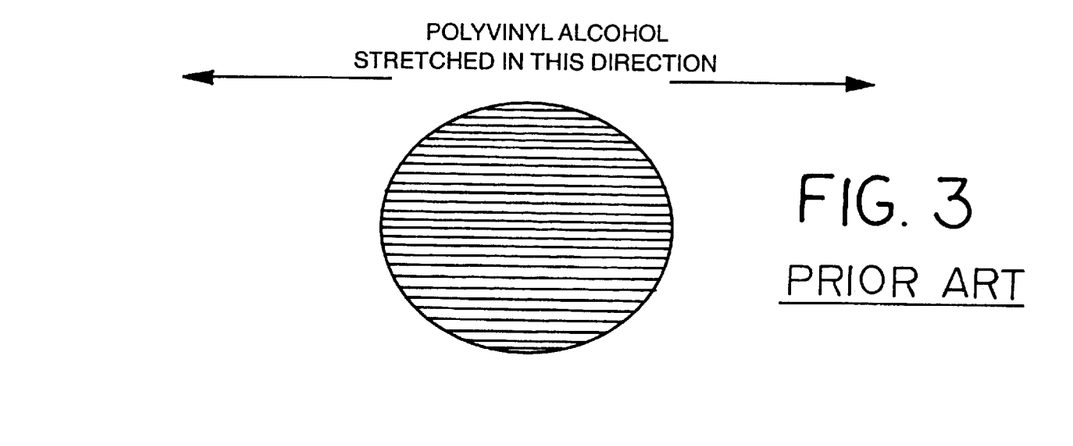
FIG. 3 is a partially schematic, sectional view of a film made from polyvinyl alcohol, the film being stretched in the directions indicted by the two arrows.

With reference to FIG. 3, a film used as the polarized filter 12 is typically made from a sheet of polyvinyl alcohol, which is heated and stretched in a given direction (shown the with arrows) with the long hydrocarbon molecules of the polyvinyl alcohol becoming aligned during the stretching process.

The sheet shown in FIG. 3 is then dipped into an ink solution rich in iodine. The iodine impregnates the plastic sheet and attaches to the straight long-chain polymeric molecules, effectively forming a chain of its own. The longer the film remains in the iodine solution, the greater amount of iodine that impregnates the film, making the film darker and reducing the transmission of light. Various colors of the iodine solution may be used to produce different colors of film that have noticeably different effects and uses. Amber-colored films have a tendency to reduce the amount of light transmission in the blue area of the spectrum, whereas neutral-colored films do not reduce the blue area of the spectrum. Dark-colored films are best to be used in lenses designed to be worn in bright sunlight, whereas lighter-colored films are best used as photography filters. Typically, the film is approximately 30 microns in thickness. In order to protect the surface and shape of this polarizing film, it can be incorporated into the interior of a lens. The surrounding lens material, which can be made of glass or plastic, then protects the film.

The lens 10 of FIG. 10 also includes an absorptive lens wafer 14. An absorptive lens is one that reduces the amount of transmitted light or radiant energy; thus, it acts as a filter. Absorption may be uniform, absorbing visible light of all wavelengths, or selective, absorbing some wavelengths more than others. Absorptive lenses are sometimes referred to as tinted or colored lenses because they are not usually clear and colorless, as are lenses made of white ophthalmic crown glass.

The most common forms of absorptive lenses produced by lens manufacturers today are (1) tinted solid glass lenses, (2) glass lenses with surface coatings, (3) tinted solid plastic lenses, (4) photochromic lenses, and (5) polarizing lenses. This invention incorporates different manufacturing techniques to produce a unique lens with unusual absorption characteristics.

Figure 5:
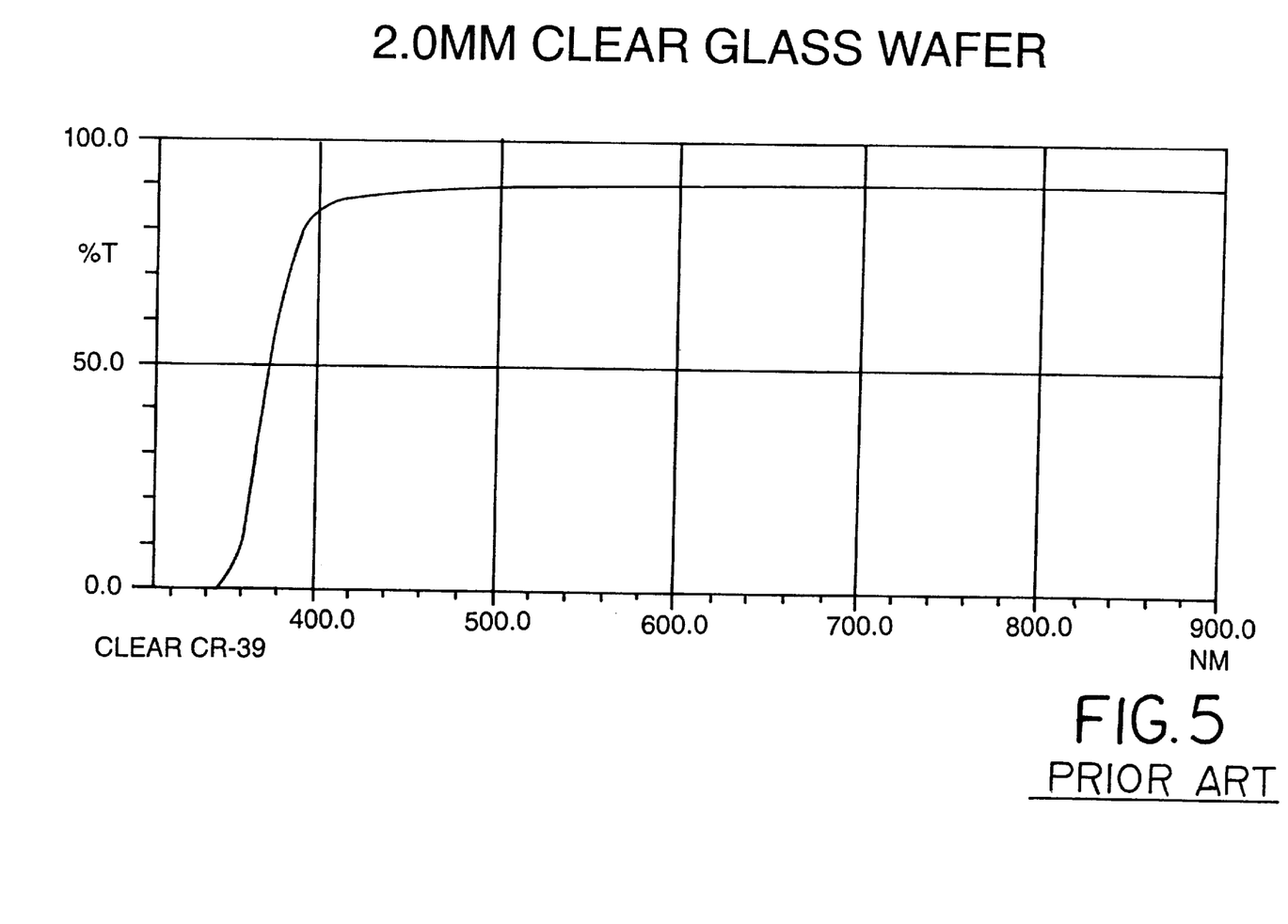
FIG. 5 is a graph showing the spectral transmission of a 2.0 mm thick clear glass wafer (% T vs. nm).

The principal ingredients of white ophthalmic crown glass are silica, soda, and lime, to which small amounts of potassium, aluminum, and barium oxides are typically added to provide the desired physical and chemical properties. FIG. 5 illustrates the spectral transmission of a typical clear glass lens. To produce a tinted lens, one or more metals or metallic oxides are introduced into the basic batch at the start of the manufacturing process. The spectral transmission characteristics of the finished lenses are controlled by the quantities of these metals or metal oxides present at the initial batch stage. The concentration of metals and metallic oxides incorporated to produce colors in lenses is less than 1%, even for dense colors.

The color imparted by the addition of an absorptive substance is of no particular significance: it is merely an incidental by-product. The color of the lens does not indicate the specific absorptive characteristics of the lens in the UV or IR regions. The apparent color of the lens depends on those portions of the visible spectrum that are transmitted. If a lens transmits more of the green portion of the visible spectrum than it does of the blue, the lens appears to be green by the transmitted light. This apparent color is useful for determining the general effect on the visible portion of the spectrum. If the transmission is uniform across the visible spectrum, the lens appears to be a neutral gray, an d any colors viewed through it are not appreciably changed. However, the overall brightness of the scene appears to decrease. If the transmission over the visible spectrum is not uniform, but selective, the lens appears to have a distinct color, and the color of any object viewed through the lens may be altered.

The lens wafer 14 in FIG. 10 is preferably constructed of mineral glass, but could also be made of an organic material such as plastic, resin, or polycarbonate, and includes an oxide that improves color discrimination by transmitting a relatively large percentage of light at specific wavelengths that are most easily distinguished by the brain, and by absorbing as much light as possible at specific wavelengths that are the less easily distinguished by the brain, and thus transmitting a relatively low percentage of light a t those wavelengths. As illustrated, the lens wafer 14 includes neodymium (Nd). Adding neodymium to the basic batch in the initial process for producing a glass lens of the invention results in a spectral transmission that is relatively high in the 450, 540 and 610 nm ranges, the three primary channels for increased chromatic response. Neodymium also absorbs nearly all light in the 580 nm range, one of the least effective channels for chromatic response.

Figure 6:
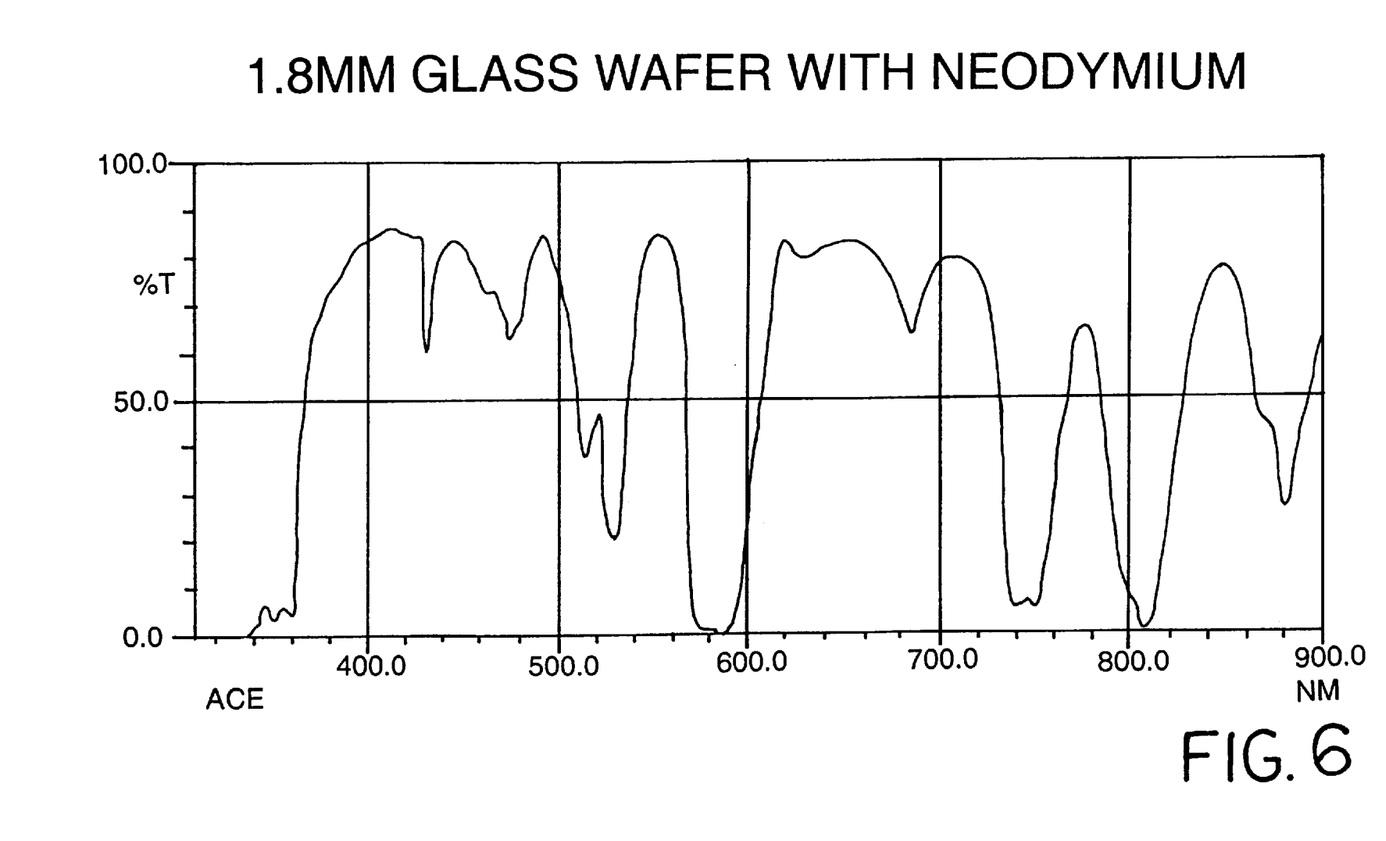
FIG. 6 is a graph showing the spectral transmission of a 1.8 mm thick glass wafer according to the invention (% T vs. nm).
Figure 7:
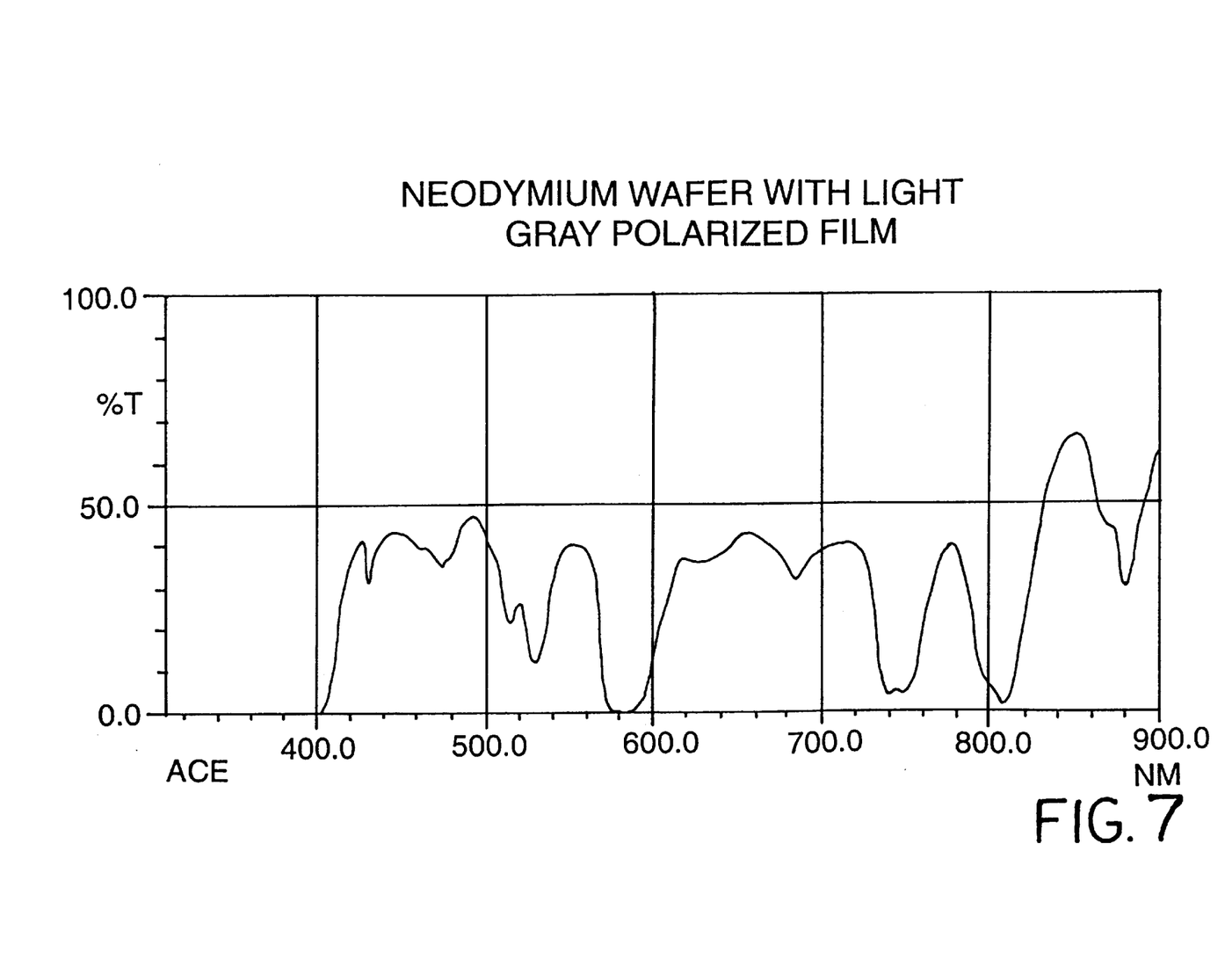
FIG. 7 is a graph showing the spectral transmission of a glass wafer according to the invention, including a light gray polarized film (% T vs. nm).
Figure 8:
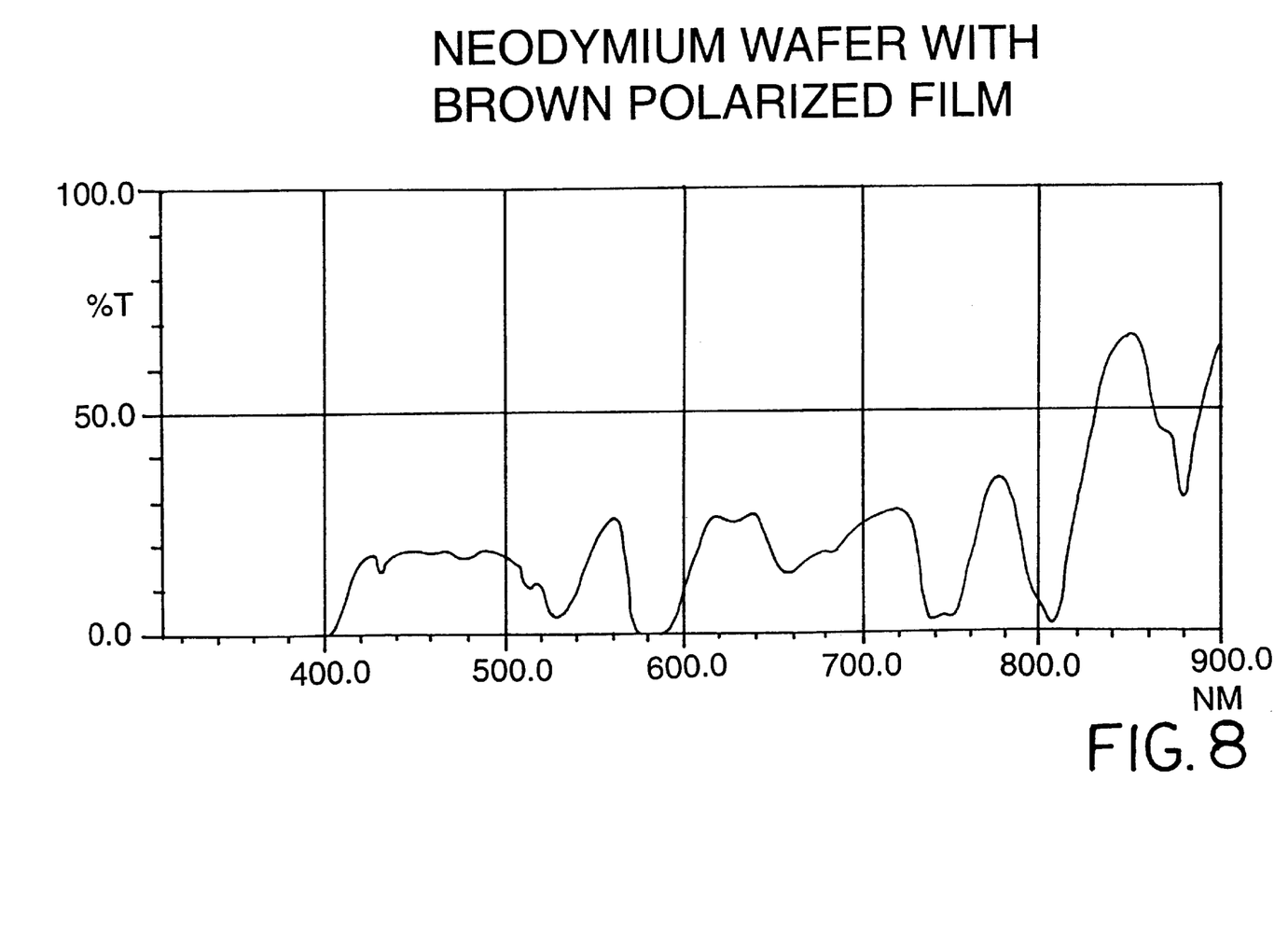
FIG. 8 is a graph showing the spectral transmission of a glass wafer according to the invention, including a brown polarized film (% T vs. nm).

FIG. 6 records the spectral transmission of a 1.8 mm glass wafer in which neodymium has been added. Light transmittency at 450 nm, 540 nm, and 610 nm is relatively high compared to transmittency at 500 nm and 580 nm, which is relatively low. FIG. 7 illustrates the spectral transmission of such a neodymium wafer combined with a light gray polarized film. FIG. 8 illustrates the spectral transmission of such a neodymium wafer combined with a brown polarized film.

The lens 10 of FIG. 10 was prepared using the WeatherEyes™ coating process, with an anti-reflection layer 16 on the front surface of the lens sealed with a hydrophobic protective layer 18. Specifically, the lens includes the following adjacent materials:

1) the optional front hydrophobic top layer 18;
2) the optional front anti-reflection layer 16;
3) the front lens wafer 14 containing neodymium;
4) the polarized filter 12;
5) an optional back lens wafer 15 containing neodymium;
6) a n optional back anti-reflection layer 17; and
7) an optional hydrophobic back top layer 19.

Figure 9:
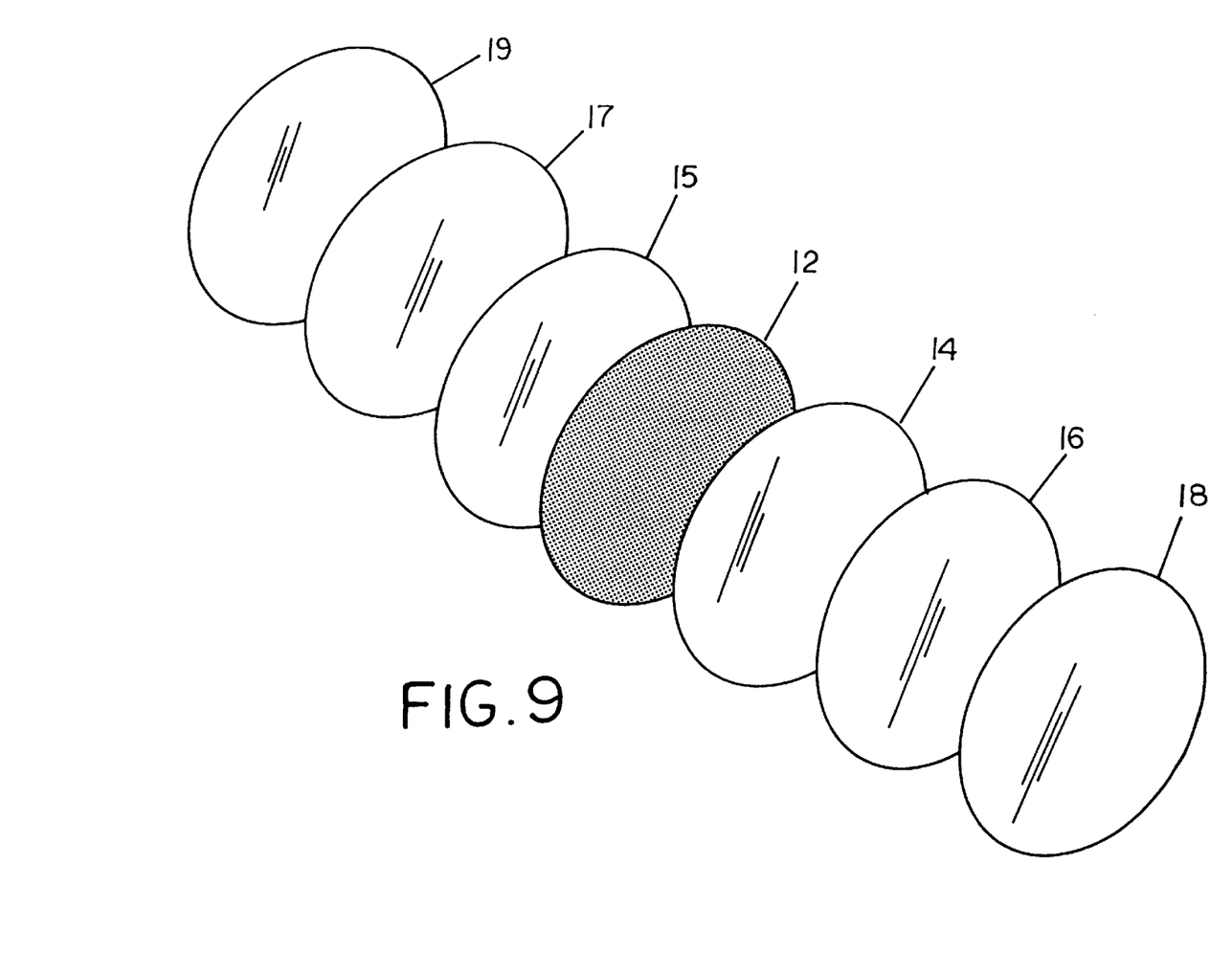
FIG. 9 is a partially schematic and expanded view of a lens according to the invention.

FIG. 9 illustrates a combination of wafers making up a lens that includes hydrophobic protective layers 18 and 19, anti-reflection layers 16 and 17, a polarized filter 12, and two lens wafers 14 and 15 containing neodymium.

Using a neodymium-laced wafer as one or both of the wafers 14, 15 encasing the polarized filter 12 produces a unique lens, altering the original hue of the polarized filter 12 and the neodymium-laced wafers. The lens controls glare by filtering out polarized reflected light, and enhances color discrimination by selectively transmitting and absorbing different parts of the visible spectrum.

Alternatively, neodymium may bee included in a coating or a film which may be placed or coated on a glass wafer, or in the polarized film layer.

A lens according to the invention may be made from a molded plastic lens material that includes both a polarized film and an oxide. For example, a plastic polarized lens, such as a polycarbonate polarized lens, may be made by positioning a polarized film within a mold while plastic material is injected around the film, thus encapsulating and protecting the polarized film. An appropriate oxide may be in the polarized film or in the plastic material.

After the lens is produced, it preferably is coated with one or more AR coatings to prevent the reflection of light from the surface of the lens. Before t he coatings are applied, the lens should be prepared by careful cleaning and then baked for at least two hours to remove water vapor and volatile organic compounds. The coating process may then be carried out in a vacuum environment with the use of an electron beam evaporation source and micro-processor-controlled monitoring techniques.

Figures 11, 12:
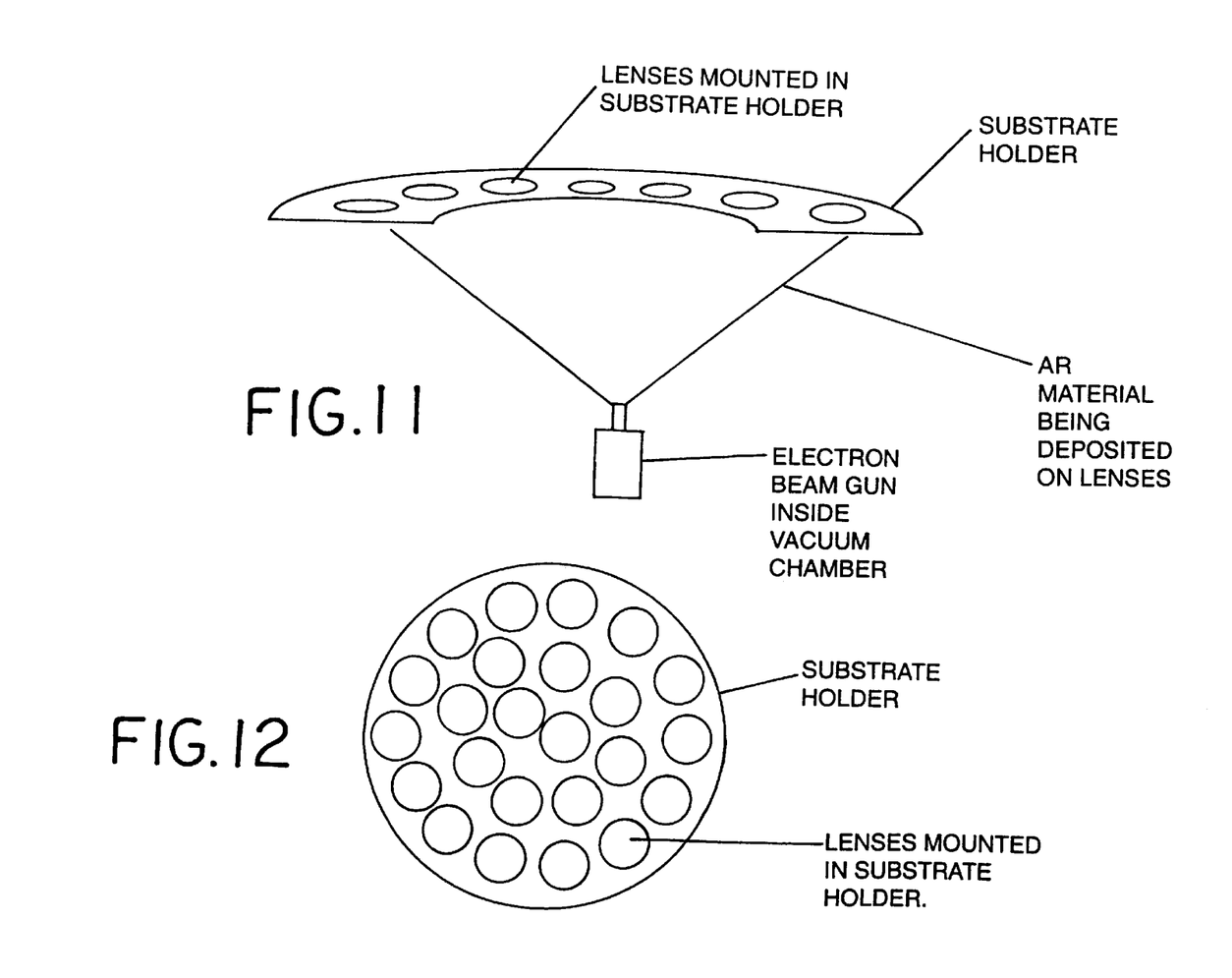
FIG. 11 is a schematic side view of a lens coating mechanism in a vacuum chamber.
FIG. 12 is a top plan view of the mechanism shown in FIG. 11.

FIGS. 11 and 12 illustrate how a coating is applied to a lens inside a vacuum chamber. A set of lenses 40 are placed on a rack 42 (called the substrate holder) and put into position to receive the evaporated material. The preferred material used for deposition onto the lens is magnesium hexafluoride. A single, thin coating placed directly on the lens surface is seldom hard and durable enough to withstand the severe conditions ophthalmic lenses usually encounter. Accordingly, it may be preferable to deposit multiple layers of magnesium hexafluoride on each outside surface of the lenses. As illustrated, five layers have been applied. After the layers of AR material are deposited, an additional layer of a hydrophobic material may be evaporated on top of the AR material. The hydrophobic material protects the AR material and makes it easier to clean by making the surface very slick and water repellant.

Figure 13:
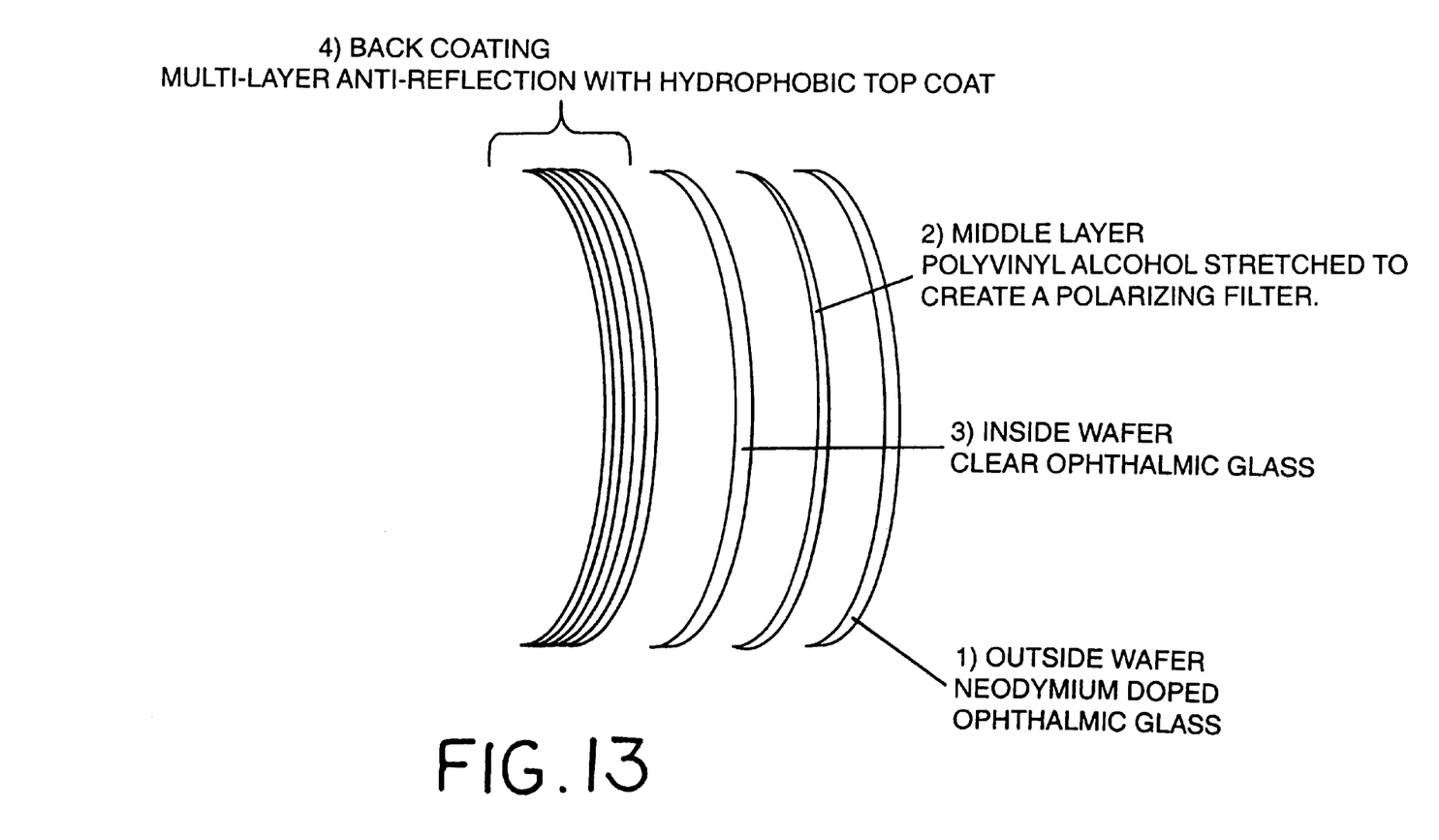
FIG. 13 is a partially schematic and expanded view of a third embodiment of a lens according to the invention.

FIG. 13 illustrates an alternative embodiment of a lens 10' according to the invention. The outside front wafer 14 of the lens 10' is made of ophthalmic glass with a composition that usually consists of silicon, arsenic, boron, sodium, zinc, lithium, potassium, aluminum, phosphorous, magnesium, calcium, barium, and strontium. Neodymium has been added to this composition. Neodymium preferably does not exceed a mole percentage of 10. Still preferably, the mole percentage of Neodymium is between 2% and 10%. The lens is ground and polished to an approximate thickness of 1.2 mm. As illustrated, the curvatures of the convex and the concave side of this front glass wafer are equal to each other.

A middle, polarized film layer 12' of the lens 10' is made of polyvinyl alcohol, which has been stretched in a given direction, causing its long hydrocarbon molecules to become aligned in the process. The stretched sheet is then dipped into an ink solution rich in iodine. The iodine impregnates the plastic and attaches to the straight long-chain polymeric molecules, effectively forming a chain of its own. The stretched polyvinyl alcohol is glued to the concave surface of the front wafer. One sample of this material was dyed with gray iodine (see FIG. 7 for spectral transmission), while a second sample of this material was dyed with brown iodine (see FIG. 8 for spectral transmission).

The inside back wafer 15' is ophthalmic glass with a composition that usually consists of silicon, arsenic, boron, sodium, zinc, lithium, potassium, aluminum, phosphorous, magnesium, calcium, barium and strontium. This lens wafer is ground and polished with the convex curvature to be the same as that on the concave surface of the outside front wafer 14'. The back wafer 15' can be ground to various thicknesses. It preferably is ground to an approximate thickness of about 1.0 mm to about 1.2 mm for the use of the non-prescription lenses. A back wafer or blank whose thickness exceeds 2.0 mm can have special curve ground for prescription use. The non-prescription wafer or the thicker blank to be used for prescription grinding is then glued to the concave side of the middle layer 12' which has been glued to the front wafer 14'.

As light transmits initially through the front glass wafer containing the neodymium, it is selectively absorbed and transmitted. The selective transmittance increases a person's color discrimination and visual enhancement. When the remaining light is transmitted through the polyvinyl alcohol, a portion of the polarized light becomes absorbed, reducing the visually disturbing glare from the visual field.

Lenses according to the invention transmit light to the lens with minimal reflection. The transmitted light is selectively absorbed to improve a person's color discrimination and filtered to eliminate obtrusiveglare.

I claim:

1. A multi-layer lens for eyeglasses comprising:
    a first lens wafer having rare earth oxide additive, the additive comprising between about 1% and 2% (by mole) neodymium and being adapted to impart light transmittancy characteristics to the lens such that the lens will exhibit a light transmittancy at 450 nm that is greater than a light transmittancy at 500 nm, the lens further exhibiting an average light transmittancy at 540 nm and 610 nm that is greater than a light transmittancy at 580 nm;
    a second lens wafer;
    a polarizing layer between the first and second lens wafers; and
    an anti-reflective layer adjacent an outside surface of at least one of the lens wafers.

2. The multi-layer lens of claim 1, wherein the additive comprises between about 1.1% and about 1.4% (by mole) neodymium.

3. A multi-layer lens for eyeglasses comprising:
    a first lens wafer having an additive, the additive comprising only a single rare earth oxide, the rare earth oxide comprising between about 1% and about 2% (by mole) neodymium, the additive imparting the following light transmittancy characteristics to the lens:
        a light transmittancy at 450 nm that is greater than a light transmittancy at 500 nm;
        an average light transmittancy at 540 nm and 610 nm that is greater than a light transmittancy at 580 nm;
    a second lens wafer;
    a polarizing layer between the first and second lens wafers; and
    an anti-reflective layer.

4. The multi-layer lens of claim 3, wherein the additive comprises between about 1.1% and about 1.4% (by mole) neodymium.

* * * * *